(No Model.)
F. E. VAN HOUTEN.
KITCHEN TABLE.
No. 527,303. Patented Oct. 9, 1894.
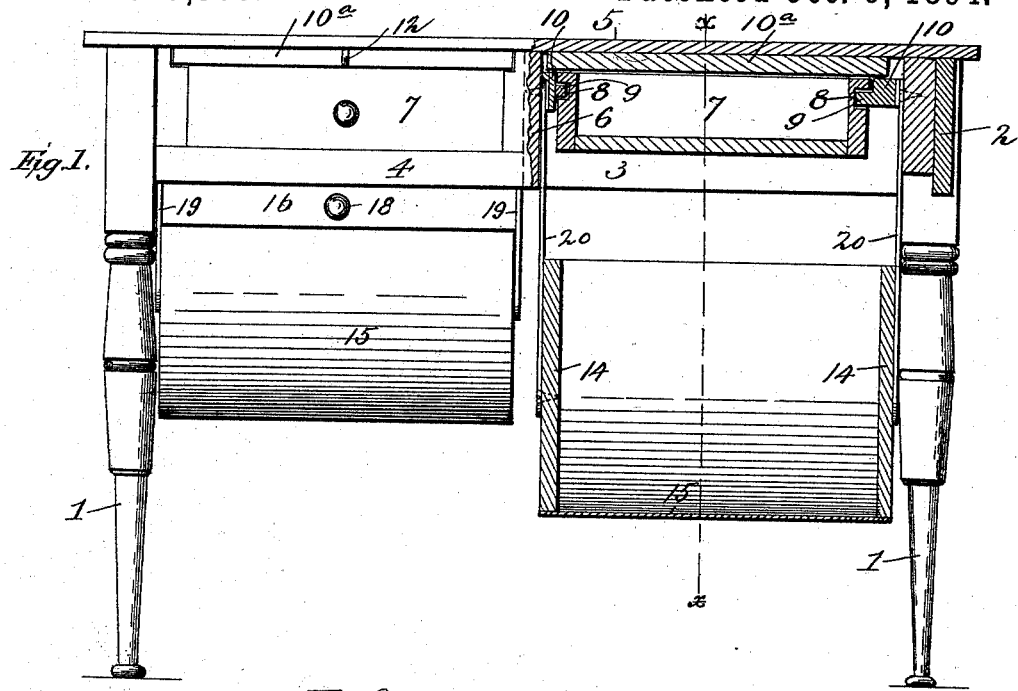
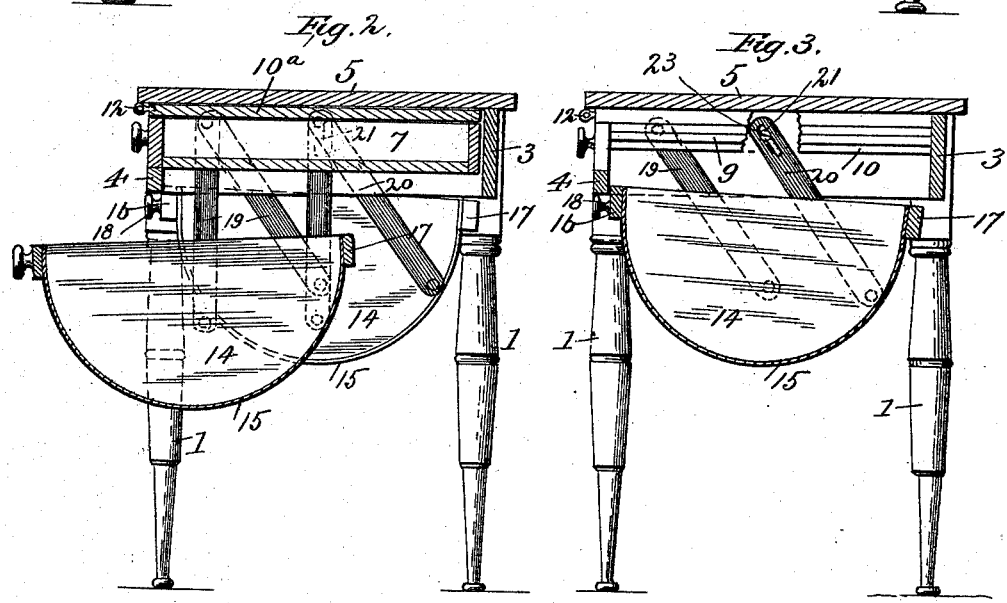
WITNESSES:
F. L. Durand
J. L. Coombs
INVENTOR:
Fred E. Van Houten,
by James Sayer & Co.
Attorneys

UNITED STATES PATENT OFFICE.

FRED E. VAN HOUTEN, OF HOYTVILLE, MICHIGAN.

KITCHEN-TABLE.

SPECIFICATION forming part of Letters Patent No. 527,303, dated October 9, 1894.

Application filed March 20, 1894. Serial No. 504,390. (No model.)

*To all whom it may concern:*

Be it known that I, FRED E. VAN HOUTEN, a citizen of the United States, and a resident of Hoytville, in the county of Eaton and State of Michigan, have invented certain new and useful Improvements in Kitchen-Tables; and I do hereby declare that the following is a full, clear, and exact description of the invention, which will enable others skilled in the art to which it appertains to make and use the same, reference being had to the accompanying drawings, which form a part of this specification.

My invention relates to improvements in kitchen tables, designed more particularly for use in making bread, cakes and similar articles, and it consists in the novel construction and combination of parts hereinafter fully described and claimed.

In the accompanying drawings: Figure 1 is a front view of a table constructed in accordance with my invention, partly broken away. Fig. 2 is a transverse sectional view of the same on the line $x$—$x$, Fig. 1, the flour bin being opened. Fig. 3 is a similar view, the bread board and drawer being removed and the flour bin closed.

In the said drawings, the reference numeral 1 designates the legs connected together by side bars 2, rear bar 3, and front bar 4, and provided with a rectangular top 5. In the present case, where I have illustrated the table as being provided with two bread boards, two drawers and two flour bins, the numeral 6 designates a central partition secured to said front and rear bars. The front bar 4, is formed with two rectangular openings to receive the drawers 7, the sides of which are formed with grooves 8, which engage with ribs 9, of the cleats 10, secured respectively to the side bars 2 and partition 6. The upper edges of these cleats do not extend quite up to the under side of the top 5 of the table forming ways for the removable rectangular bread boards 10ª, located above the drawers. These boards are provided with eyes 12 by which they may be pulled out. Located beneath the said drawers are two swinging pivoted flour bins, each consisting of two semi-circular end boards 14, to the circular edges of which is secured a sheet metal plate 15 forming the bottom of the bin. The numerals 16 and 17 designate two longitudinal cleats secured, respectively, to the front and rear of said end boards, and the front cleats provided with knobs 18.

Centrally pivoted to end boards of the bins on the outside thereof are two upwardly extending arms 19 the opposite ends of which are fulcrumed to the side bars 2 and partition 6, near the front of the table. In rear of these arms 19 are two similar arms 20 the lower ends of which are pivoted to said end boards near the rear thereof, while their upper ends are formed with slots 21, which engage with studs 23, secured to said end boards and partition. The cleats 10, are formed with recesses for the passage of the upper ends of the arms 19 and 20.

By the above construction when the flour bin is closed, as seen in Fig. 3, the weight of the flour therein will cause the front cleat to press against the inner lower edge of the front bar 4, whereby the bin is held in its closed position. To open the bin, the front end thereof is pressed downward, turning on the pivots, of arms 19, until it clears the said edge of the front bar, when it can be readily swung forward, as seen in Fig. 2. This slight turning on the central pivots is permitted by the slots in the rear arms 21.

The arms 20, serve to support the bins and to prevent their turning on their pivots and dumping the contents, and by means of the slots in their upper ends, the bins can be slightly tilted so as to cause the front cleat to be disengaged from the front bar 4.

While I have shown and described the table as being provided with two flour bins, drawers and bread boards, it is obvious that but one each of these may be employed if desired.

The bread board can be readily removed from the table for use and replaced when done with.

Having thus described my invention, what I claim is—

The combination with a kitchen table, of the swinging flour bins, having front cleats adapted to engage with the front bar of the table, the front arms having their lower ends pivoted to the ends of the bins at or near the center and their upper ends pivoted to the table near the front thereof, the rear arms pivoted to the ends of the bins in rear of the front arms and formed with slots at their upper ends, and the studs secured to the table with which said slots engage, said rear arms serving to support the bins when open and by means of the slots allowing the bins to be turned on the pivots to disengage the cleat from the front board of the table, substantially as described.

In testimony that I claim the foregoing as my own I have hereunto affixed my signature in presence of two witnesses.

FRED E. VAN HOUTEN.

Witnesses:
  JOHN DILLEY, Jr.,
  CORNELIUS VAN HOUTEN.